US012714938B2

(12) United States Patent
Jiang

(10) Patent No.: US 12,714,938 B2
(45) Date of Patent: Aug. 25, 2026

(54) METHOD AND APPARATUS FOR GUIDING TASK IN GAME

(71) Applicant: NETEASE (HANGZHOU) NETWORK CO., LTD., Hangzhou (CN)

(72) Inventor: Yangchen Jiang, Hangzhou (CN)

(73) Assignee: NETEASE (HANGZHOU) NETWORK CO., LTD., Hangzhou City (CN)

( * ) Notice: Subject to any disclaimer, the term of this patent is extended or adjusted under 35 U.S.C. 154(b) by 218 days.

(21) Appl. No.: 18/553,064

(22) PCT Filed: Feb. 24, 2022

(86) PCT No.: PCT/CN2022/077573
§ 371 (c)(1),
(2) Date: Sep. 28, 2023

(87) PCT Pub. No.: WO2022/218039
PCT Pub. Date: Oct. 20, 2022

(65) Prior Publication Data

US 2024/0189716 A1 Jun. 13, 2024

(30) Foreign Application Priority Data

Apr. 14, 2021 (CN) ........................ 202110402207.1

(51) Int. Cl.
*A63F 13/5378* (2014.01)
*A63F 13/2145* (2014.01)
(Continued)

(52) U.S. Cl.
CPC ...... *A63F 13/5378* (2014.09); *A63F 13/2145* (2014.09); *A63F 13/5372* (2014.09);
(Continued)

(58) Field of Classification Search
CPC ............. A63F 13/5378; A63F 13/2145; A63F 13/5372; A63F 13/5375; A63F 13/822; A63F 13/92; A63F 13/35
See application file for complete search history.

(56) References Cited

U.S. PATENT DOCUMENTS

2004/0143852 A1 7/2004 Meyers
2008/0102949 A1 5/2008 Hasegawa et al.
(Continued)

FOREIGN PATENT DOCUMENTS

CN 108295468 A 7/2018
CN 108310771 A 7/2018
(Continued)

OTHER PUBLICATIONS

Minimap. warcraft.wiki.gg. Online. Mar. 6, 2021. Accessed via the Internet. Accessed Jul. 18, 2025. <URL: https://warcraft.wiki.gg/wiki/Minimap?oldid=1247274> (Year: 2021).*
(Continued)

*Primary Examiner* — Carl V Larsen
(74) *Attorney, Agent, or Firm* — Qinghong Xu

(57) ABSTRACT

The embodiments of the present disclosure provide a method and apparatus for guiding a task in a game. The method includes: determining, in response to a selection instruction for the task panel, a target task from the at least one task, acquiring one or a plurality of task locations for accomplishing the target task in the game scenario, and providing a task guidance map on the graphical user interface; and displaying a target task identification in the task guidance map, where the target task identification includes a location identification located in the task guidance map indicating the one or the plurality of the task locations, and/or an orientation identification indicating a direction to the one or the plurality of the task locations.

19 Claims, 12 Drawing Sheets

(51) Int. Cl.

| | |
|---|---|
| ***A63F 13/5372*** | (2014.01) |
| ***A63F 13/5375*** | (2014.01) |
| ***A63F 13/822*** | (2014.01) |
| ***A63F 13/92*** | (2014.01) |
| *A63F 13/35* | (2014.01) |

(52) U.S. Cl.
CPC ........ *A63F 13/5375* (2014.09); *A63F 13/822* (2014.09); *A63F 13/92* (2014.09); *A63F 13/35* (2014.09)

(56) References Cited

U.S. PATENT DOCUMENTS

| | | | | |
|---|---|---|---|---|
| 2009/0104990 | A1* | 4/2009 | Tsujino | A63F 13/5255 463/32 |
| 2013/0059634 | A1 | 3/2013 | Behmaram-Mosavat | |
| 2015/0290535 | A1* | 10/2015 | Wroblewski | A63F 13/5378 463/31 |
| 2015/0290541 | A1* | 10/2015 | Ahmed | A63F 13/2145 463/31 |
| 2015/0293668 | A1* | 10/2015 | Kurabayashi | G06F 3/04842 463/31 |
| 2017/0337776 | A1* | 11/2017 | Herring | A63F 13/79 |
| 2019/0366212 | A1 | 12/2019 | Kusakihara | |
| 2020/0269143 | A1* | 8/2020 | Benedetto | A63F 13/79 |
| 2020/0316473 | A1* | 10/2020 | Qiu | A63F 13/56 |
| 2021/0322864 | A1* | 10/2021 | Shao | A63F 13/92 |
| 2023/0321535 | A1* | 10/2023 | Xie | G06T 19/003 |

FOREIGN PATENT DOCUMENTS

| | | | |
|---|---|---|---|
| CN | 109432775 | A | 3/2019 |
| CN | 109876442 | A | 6/2019 |
| CN | 111185004 | A | 5/2020 |
| CN | 111265865 | A | 6/2020 |
| CN | 111475089 | A | 7/2020 |
| CN | 111729298 | A | 10/2020 |
| CN | 112426715 | A | 3/2021 |
| CN | 112619124 | A | 4/2021 |
| CN | 113082708 | A | 7/2021 |
| KR | 20090060648 | A | 6/2009 |

OTHER PUBLICATIONS

Map & Quest Log. warcraft.wiki.gg. Online. Aug. 11, 2020. Accessed via the Internet. Accessed Jul. 18, 2025. <URL: https://warcraft.wiki.gg/wiki/Map_%26_Quest_Log?oldid=3614303> (Year: 2020).*

World of Warcraft. wikipedia.org. Online. Mar. 28, 2021. Accessed via the Internet. Accessed Jul. 18, 2025. <URL: https://en.wikipedia.org/w/index.php?title=World_of_Warcraft&oldid=1014752273> (Year: 2021).*

[Help] new to retail wow. how do i move and resize the Shift+M minimap. Reddit.com. Online. 2020. Accessed via the Internet. Accessed Jul. 18, 2025. <URL: https://www.reddit.com/r/WowUI/comments/ki9bys/help_new_to_retail_wow_how_do_i_move_and_resize/> (Year: 2020).*

Auto small map. Wowhead.com. Online. Jan. 24, 2011. Accessed via the Internet. Accessed Jul. 18, 2025. <URL: https://www.wowhead.com/forums/topic/auto-small-map-180971> (Year: 2011).*

"World of Warcraft 6.0 Interface Changes Overview—Task Tracking and Map Integration", wow.17173.com/content/2014-06-07/20140607114113914.shtml.

1st Office Action dated Dec. 29, 2021 of Chinese Application No. 202110402207.1.

Notice of Allowance dated Mar. 30, 2022 of Chinese Application No. 202110402207.1.

International Search Report dated May 23, 2022 of International Application No. PCT/CN2022/077573.

* cited by examiner determining a target task from the at least one task in response to a selection instruction for the task panel, acquiring one or a plurality of task locations for accomplishing the target task in the game scenario, and providing a task guidance map on the graphical user interface; 201 displaying a target task identification in the task guidance map, wherein the target task identification comprises a location identification located in the task guidance map indicating the one or the plurality of the task locations, and/or an orientation identification indicating a direction to the one or the plurality of the task locations 202

FIG.2

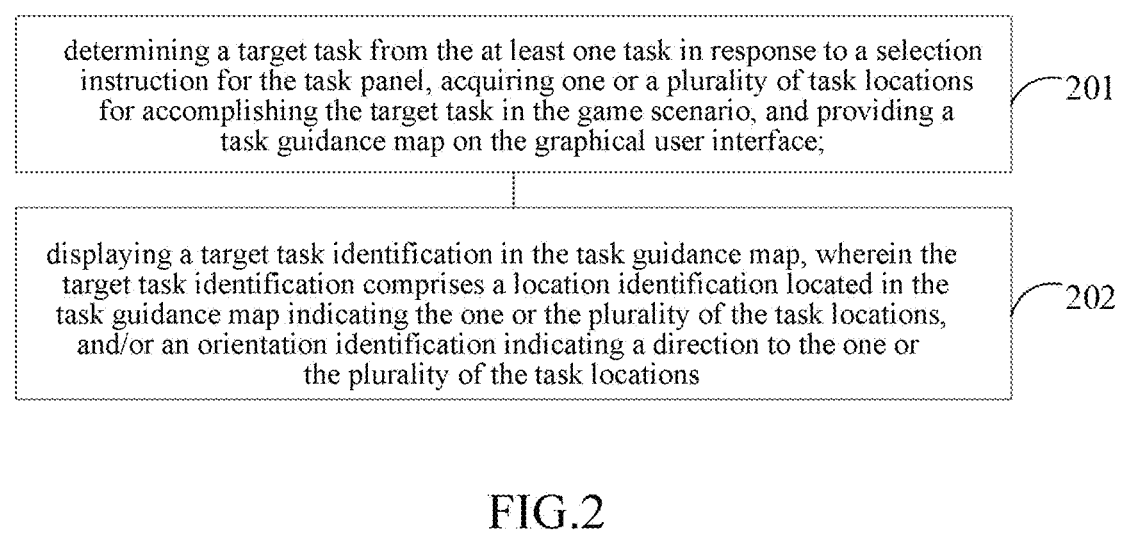

METHOD AND APPARATUS FOR GUIDING TASK IN GAME

CROSS-REFERENCE

The present disclosure is the U.S. National Phase application of PCT Application No. PCT/CN2022/077573, filed on Feb. 24, 2022, which is based on and claims priority to Chinese Patent Application No. 202110402207.1, entitled "METHOD AND APPARATUS FOR GUIDING TASK IN GAME", filed on Apr. 14, 2021, the entire content of both of which are incorporated herein by reference for all purposes.

TECHNICAL FIELD

The present disclosure relates to a field of game technology, and more particularly to a method for guiding a task in a game and an apparatus for guiding a task in a game.

BACKGROUND

In MMO (Massively Multiplayer Online) mobile games, players are usually engaged in various game tasks recommended by a system in an open-world environment. There are many kinds of tasks in the game, and interaction scenarios and NPCs (non-player characters) of each task are often different. However, in an existing game interface, a task and a map are displayed separately, and a player needs to check the map and the task many times to accomplish a task chain during the game, which cannot obtain a smooth game experience.

It should be noted that information disclosed above is merely configured to enhance understanding of BACKGROUND of the present disclosure, which may include information that does not constitute a prior art known to those skilled in the related art.

SUMMARY

In view of the above defects, embodiments of the present disclosure are proposed to provide a method for guiding a task in a game and a corresponding apparatus for guiding a task in a game.

The embodiment of the present disclosure further discloses a method for guiding a task in a game, a graphical user interface is provided through a mobile terminal, where a content displayed on the graphical user interface includes a task panel and a game scenario, and the task panel includes at least one task, where the method includes:

- determining, in response to a selection instruction for the task panel, a target task from the at least one task, acquiring one or a plurality of task locations for accomplishing the target task in the game scenario, and providing a task guidance map on the graphical user interface; and
- displaying a target task identification in the task guidance map, where the target task identification includes a location identification located in the task guidance map indicating the one or the plurality of the task locations, and/or an orientation identification indicating a direction to the one or the plurality of the task locations.

The embodiment of the present disclosure further discloses an electronic device, including:

- a processor and a storage medium storing a machine-readable instruction that is executable by the processor, when the electronic device runs, the processor executes the machine-readable instruction to perform the method according to any one of embodiments of the present disclosure.

The embodiment of the present disclosure further discloses a non-transitory computer-readable storage medium configured to store a computer program for executing the method according to any one of embodiments of the present disclosure when executed by a processor.

It should be understood that the foregoing general descriptions and the following detailed descriptions are exemplary and explanatory only, and are not intended to limit the present disclosure.

BRIEF DESCRIPTION OF THE DRAWINGS

In order to illustrate a technical solution in embodiments of the present disclosure more clearly, drawings used in the description of the embodiments are briefly described below. Obviously, the drawings described below merely show some embodiments of the present disclosure. For those skills in the art, other drawings may also be obtained according to these drawings without creative work.

FIG. 2 is a flowchart illustrating steps of a method for guiding a task in a game provided by an embodiment of the present disclosure;

DETAILED DESCRIPTION

In order to make the objects, technical solutions and advantages of embodiments of the present disclosure more clear, the technical solutions of the present disclosure will be further described in detail below with reference to the accompanying drawings and specific embodiments. Obviously, the described embodiments are some embodiments of the present disclosure rather than all embodiments. All other embodiments obtained by those skilled in the art based on the embodiments of the present disclosure without creative efforts shall fall within the protection scope of the present disclosure.

Figure 1A:
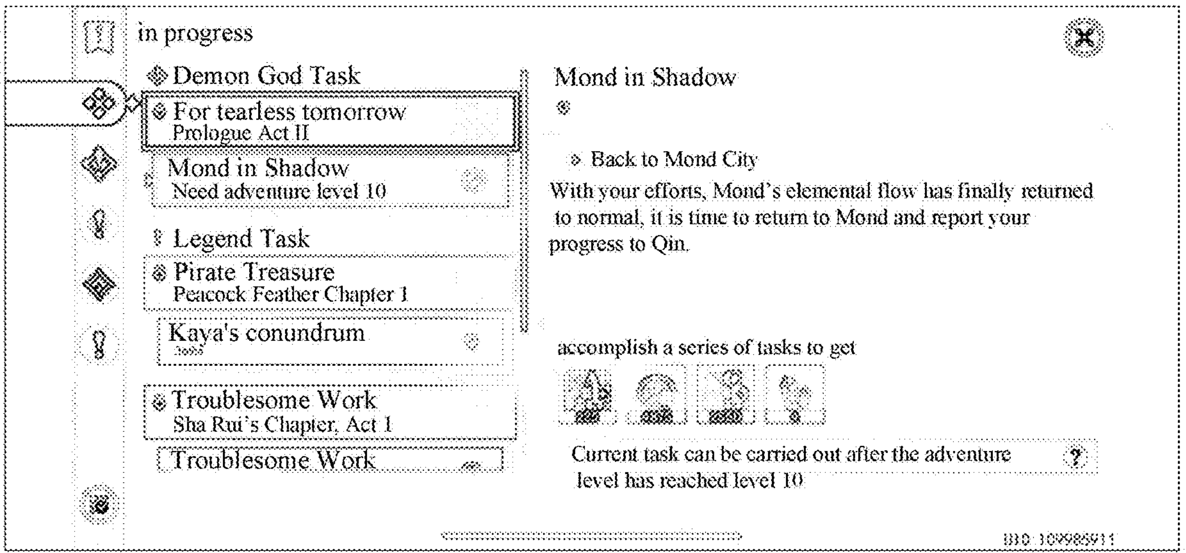
FIG. 1A is a schematic view of a task panel in the related art.
Figure 1B:
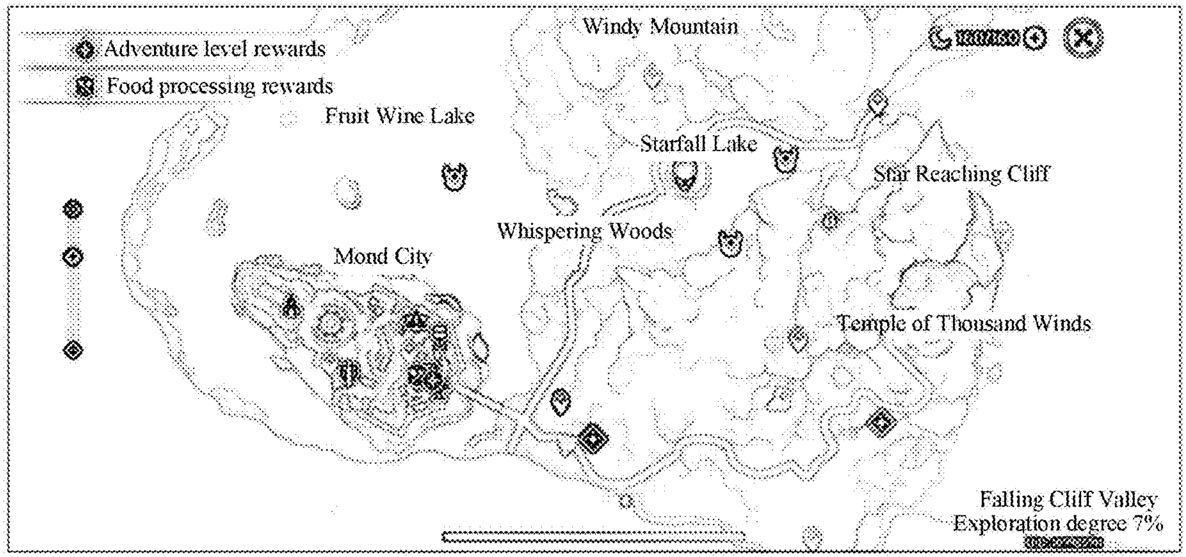
FIG. 1B is a schematic view of a map interface in the related art.

Generally, when checking a scenario of the task, the players need to open a map through an in-game map function, find a corresponding task icon on the map, and then follow in-game guidance to a task point after auto-navigating or setting a marker point. For a task chain with strong correlation, the players often need to go to different places in the same scenario in turn. In the existing game interface illustrated in FIGS. 1A to 1B, the task and the map are displayed separately, so the players cannot quickly check the locations and the correspondences of the tasks on the map.

In some optional embodiments of the present disclosure, a method for guiding a task in a game may be performed on a local terminal device or server. When the method for guiding the task in the game is performed on the server, the method for guiding the task in the game may be implemented and executed based on a cloud interaction system, where the cloud interaction system includes a server and a client device.

In an implementation, various cloud applications, such as cloud games, may be performed under the cloud interaction system. Taking a cloud game as an example, the cloud game refers to a game mode based on cloud computing. In a running mode of the cloud game, the running body of the game program and the game screen presentation body are separated, the storage and running of the method for guiding the task in the game are completed on a cloud game server, and a function of the client device is to receive and send data and display game screen. For example, the client device may be a display device having a data transmission function close to a user side, such as a first terminal device, a television, a computer, a palmtop computer, and the like. However, the cloud game server in the cloud is used for the method for guiding the task in the game. During the game, a player operates the client device to send an operation instruction to the cloud game server, the cloud game server runs the game according to the operation instruction, encodes and compresses data such as a game screen, returns the game screen to the client device through a network, and finally decodes and outputs the game screen through the client device.

In an implementation, taking a game as an example, a local terminal device stores with a game program and is used for presenting a game screen. The local terminal device is configured to interact with the player through a graphical user interface, that is, conventionally downloading and installing the game program through the electronic device and running it. The mode in which the local terminal device provides the graphical user interface to the player may include a variety of modes, for example, may be rendered on a display screen of the terminal, or provided to the player by holographic projection. For example, the local terminal device may include a display screen and a processor, the display screen is configured to present a graphical user interface, the graphical user interface includes the game screen, and the processor is configured to run the game, generate a graphical user interface, and control the display of the graphical user interface on the display screen.

In the related art, it is necessary to frequently open a map to check a location of a character currently controlled by the player and a location relationship with the task location that needs to be interacted with, which is a common way for an MMO mobile game at present. Since a task system and a map function are usually two separate systems with poor correlation, for a novice player or an open-world game type, the player is often easily lost in the game world.

Referring to FIG. 2, a flowchart illustrating steps of a method for guiding a task in a game provided by an embodiment of the present disclosure is illustrated. A graphical user interface is provided through a mobile terminal, a content displayed on the graphical user interface includes a task panel and a game scenario, the task panel includes at least one task, and the method may specifically include the following steps 201 and 202:

in step 201, in response to a selection instruction for the task panel, a target task is determined from the at least one task, one or a plurality of task locations for accomplishing the target task in the game scenario is acquired, and a task guidance map is provided on the graphical user interface;

The mobile terminal may be the aforementioned local terminal device, or may be the aforementioned client device in the cloud interaction system. The operation system of the mobile terminal may include Android, IOS, Windows Phone, Windows, and the like, and may generally support the running of various game applications.

By running a game application on the mobile terminal and rendering it on the display of the mobile terminal to obtain the graphical user interface, the content displayed on the graphical user interface may include the task panel, which may include at least one task. The task panel may be a component used to display the task in the game and the player may acquire corresponding rewards and/or experience points by accomplishing the task in the task panel. In addition, the content displayed on the graphical user interface may also include a part or all of the game scenario. The specific shape of the game scenarios may be a square or other shape (such as a circle), and the game scenario may include a virtual character, which may be a game virtual unit controlled by the player through the mobile terminal.

In some scenarios, the player needs to go to a location where the task is located when performing the task in the game, but there is no guidance on the location where the task is located on a thumbnail map corresponding to the game scenario, and associated chained tasks cannot be previewed on the thumbnail map, causing poor gaming experience for the player. In the embodiment of the present disclosure, in order to provide the player with better task guidance, the user operation is combined with the interaction operation of the map. After receiving the specified user operation, the display of the task guidance map may be triggered to facilitate the player to quickly locate the location where the task is located in the task guidance map.

Specifically, the player may perform a first operation on the task panel of the graphical user interface. The first operation is an operation for the user to interact with the task. For example, the first operation may be a long-press operation and/or a heavy-press operation. By setting a press duration, when it is detected that the player presses the task panel for a press duration, it is equivalent to receiving the long-press operation acting on the task panel. A press pressure value may also be set, when it is detected that a pressure value that the player presses the task panel reaches a press pressure value, it is equivalent to receiving the heavy-press operation acting on the task panel. In the specific implementation, the long-press operation and/or the heavy-press operation may be detected by using a screen pressure-sensing touch technology Z-Touch, and its principle is that, by sensing a top-down pressure, a location of an operation medium, such as a player's finger or a stylus and the like, may be accurately recognized, so as to achieve the strength of the finger press, to identify the location of the multi-point input and to detect a magnitude of the pressure. In addition, the first operation may also be some other user operations, which are not limited in the embodiments of the present disclosure.

After detecting the first operation of the player acting on the task panel, the terminal device sends the first operation to a game application, it is equivalent that the game application receives a selection instruction for the task panel, the selection instruction may be responded to determine the target task from at least one task, and the target task is the task selected by the player. Specifically, the selection instruction may include a touch location, and the target task may be determined from at least one task according to the touch location by extracting the touch location in the selection instruction.

After the target task is determined, the one or the plurality of task locations for accomplishing the target task in the game scenario may be further acquired. Specifically, the target task may include a plurality of sub-tasks that do not have sequential requirements among themselves. These sub-tasks may be referred to as chained tasks, each sub-task has a corresponding task location, the player need to go to these task locations for accomplishing the corresponding sub-tasks, respectively, and the target task will not end until all the sub-tasks are accomplished. For example, a plot task includes three sub-tasks, and the player need to accomplish the three sub-tasks to accomplish this plot task.

Further, after acquiring the one or the plurality of task locations for accomplishing the target task in the game scenario, the task guidance map may be provided on the graphical user interface. The task guidance map may be a simplified version of a thumbnail map corresponding to the current game, which is used to guide players to quickly locate the location where the task is located.

In some optional embodiments of the present disclosure, the task guidance map is provided on the graphical user interface, which may include the following sub-step that:

the task guidance map is provided on an edge region of the task panel.

Figure 3:
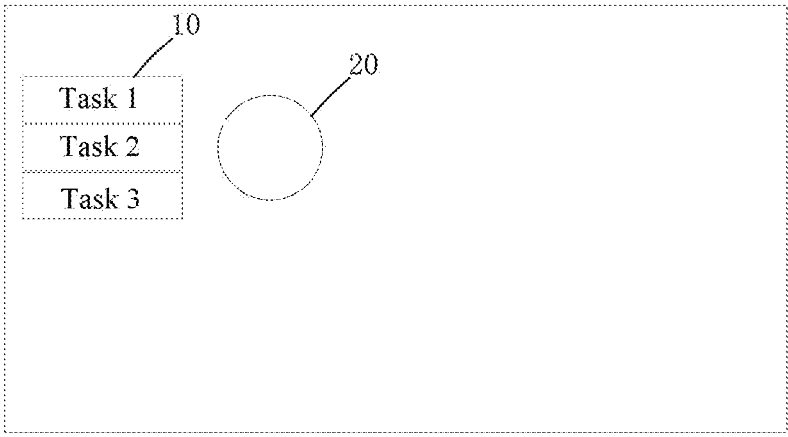
FIG. 3 is a schematic view of a task guidance map according to an embodiment of the present disclosure.
Figure 4:
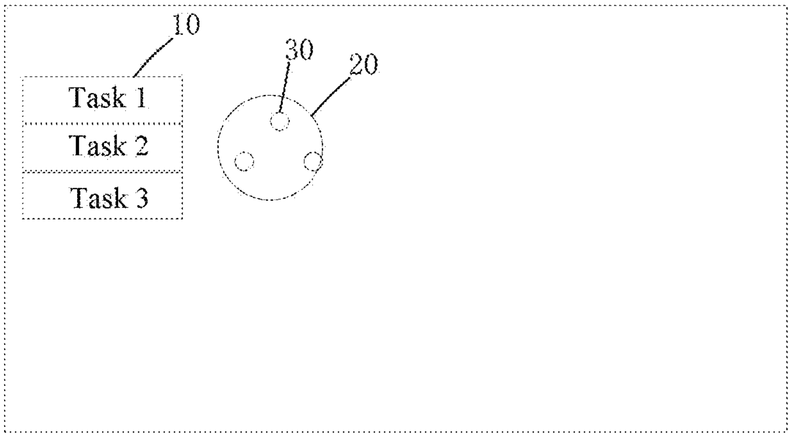
FIG. 4 is a schematic view displaying a target task identification according to an embodiment of the present disclosure.

The edge region may be a region with a certain range of size on an edge of the task panel. For example, the edge region may be a right side of the task panel, as illustrated in FIG. 3. The task guidance map 20 is displayed on the right side of the task panel 10. In addition, the edge region may also be some other regions on the graphical user interface, which are not limited in the embodiment of the present disclosure.

in step 202, a target task identification is displayed in the task guidance map, where the target task identification includes a location identification located in the task guidance map indicating the one or the plurality of the task locations, and/or an orientation identification indicating a direction to the one or the plurality of the task locations.

The target task identification may be an identification used to indicate the accomplishment of the target task. Since the target task is composed of the plurality of sub-tasks, in order to enhance the correlation of the plurality of sub-tasks corresponding to a certain task on the map, in the embodiment of the present disclosure, the target task identification may be displayed in the task guidance map. The target task identification includes the location identification located in the task guidance map indicating the one or the plurality of the task locations, and/or an orientation identification indicating a direction to the one or the plurality of the task locations.

Specifically, due to a size limitation of the task guidance map, the content displayed in a current field of view in the task guidance map is limited. Thus, the content displayed in the current field of view in the task guidance map may include a part of the task locations in the one or the plurality of task locations corresponding to the target task, while the remaining part of the task locations are not included in the content displayed in the current field of view in the task guidance map. For the one or the plurality of task locations included in the current field of view in the task guidance map, the location identification indicating the one or the plurality of task locations is displayed. For the one or the plurality of task locations not included in the current field of view in the task guidance map, the orientation identification indicating the direction to the one or the plurality of the task locations is displayed.

In some optional embodiments of the present disclosure, the graphical user interface further includes a thumbnail map corresponding to the game scenario, and the thumbnail map is configured to display a part or all of the game scenario.

Specifically, the thumbnail map be displayed on a preset location in the graphical user interface. The preset location, such as an upper right corner or a lower right corner and the like, may be preset by a developer, which are not limited in the embodiments of the present disclosure. In addition, the graphical user interface may also include a setting control for adjusting the location where the thumbnail map is displayed, and the player may adjust the location of the thumbnail map in the graphical user interface through the setting control.

In some optional embodiments of the present disclosure, the graphical user interface includes a thumbnail map corresponding to the game scenario, after the step of displaying the target task identification in the task guidance map, the method further includes the following step that:

the target task identification is displayed in the thumbnail map according to a location corresponding to the one or the plurality of task locations in the thumbnail map.

In the embodiment of the present disclosure, the corresponding location of each task location in the thumbnail map may be determined respectively, and the target task identifications may be displayed on these locations in the thumbnail map.

In some optional embodiments of the present disclosure, the map region displayed on the task guidance map is a map region determined according to a first location of a virtual character in the game scenario.

Due to a size limitation of the task guidance map, the task guidance map displayed on the graphical user interface may be a partial region of the thumbnail map corresponding to the game scenario, and the partial region may be a region with a certain range of size that is determined with the first location where the virtual character is located as a center.

In some optional embodiments of the present disclosure, the method may further include the following step that:

a character icon corresponding to the virtual character is displayed on a location corresponding to the first location in the task guidance map; in response to a sliding operation acting on the task panel, movement of the character icon is controlled; when the character icon moves to a region where the location identification in the target task identification is located, a navigation route is displayed on the task guidance map, where a starting point of the navigation route is a location corresponding to the first location in the task guidance map, and an ending point is a second location where the location identification is located; and the virtual character is controlled to follow the navigation route.

In order to facilitate the player to quickly find a path to the location where the sub-task in the target task is located, the player may also select a location identification corresponding to the sub-task that the player needs to go in the target task through the task guidance map, so as to automatically find the path to the location where the sub-task is located.

Specifically, when the task guidance map is displayed, the character icon corresponding to the virtual character may also be displayed on the location corresponding to the first location in the task guidance map. Thus, the player may control the movement of the character icon corresponding to the virtual character by performing the sliding operation on the task panel. After receiving the sliding operation acting on the task panel, the game application may respond to the sliding operation and control the movement of the character icon. Specifically, the sliding operation may include a plurality of continuous touch locations, and the character icon may be controlled to move according to the plurality of touch locations by extracting the plurality of touch locations in the sliding operation.

Figure 5:
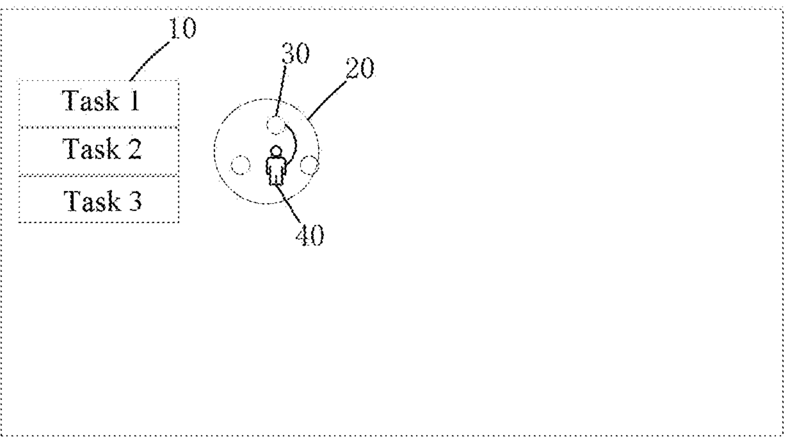
FIG. 5 is a schematic view of a navigation route according to an embodiment of the present disclosure.

When the character icon moves to a region where a certain location identification in the target task identification is located, the navigation route is displayed on the task guidance map, where the starting point of the navigation route is the location corresponding to the first location where the virtual character is located in the task guidance map, and the ending point is the second location where the location identification is located. After the navigation route is displayed, the virtual character may be further controlled to follow the navigation route, so as to automatically find the path to the location of the sub-task corresponding to the location identification in the target task, so as to accomplish the sub-task. As illustrated in FIG. 5, a navigation route from a character icon 40 to a location identification 30 is shown.

In some optional embodiments of the present disclosure, an operation for triggering the selection instruction and the sliding operation are continuous.

The operation for triggering the selection instruction may be a long-press operation and/or a heavy-press operation.

In the embodiment of the present disclosure, the operation for triggering the selection instruction and the sliding operation may be a single continuous operation, i.e., after the player performs the operation for triggering the selection instruction on the task panel through the operation medium, the task guidance map is provided on the graphical user interface. The operation medium does not leave the task panel, but continues to perform the sliding operation on the task panel through the operation medium, so as to control the movement of the character icon. The operation medium may be a player's finger, a stylus and other medium that may input a signal to the mobile terminal.

In addition, the operation for triggering the selection instruction and the sliding operation may also not be a single continuous operation, i.e., after the player performs the operation for triggering the selection instruction on the task panel through the operation medium, the operation medium may leave the task panel, then act on the task panel again when it is necessary to control the movement of the character icon and continues to perform the sliding operation on the task panel through the operation medium, so as to control the movement of the character icon.

In some optional embodiments of the present disclosure, the method may also include the following steps that:

in response to a close instruction for the task guidance map, the navigation route is displayed on the thumbnail map.

The close instruction is used to close the task guidance map displayed on the graphical user interface. Specifically, when the player controls the movement of the character icon by the sliding operation, if the sliding operation ends, for example, if the operation medium for the sliding operation leaves the mobile terminal, the sliding operation ends, and the game application is equivalent to receiving the close instruction for the task guidance map. The navigation route may be displayed on the thumbnail map. In the specific implementation, corresponding locations of several key locations on the navigation route in the task guidance map may be determined in the thumbnail map, and the navigation route may be displayed on the thumbnail map according to these locations.

In some optional embodiments of the present disclosure, the character icon includes an outer circle icon and an inner circle icon, and the controlling the movement of the character icon in response to the sliding operation acting on the task panel includes:

in response to the sliding operation acting on the task panel, controlling movement of the outer circle icon and keeping the inner circle icon stationary.

Figure 6:
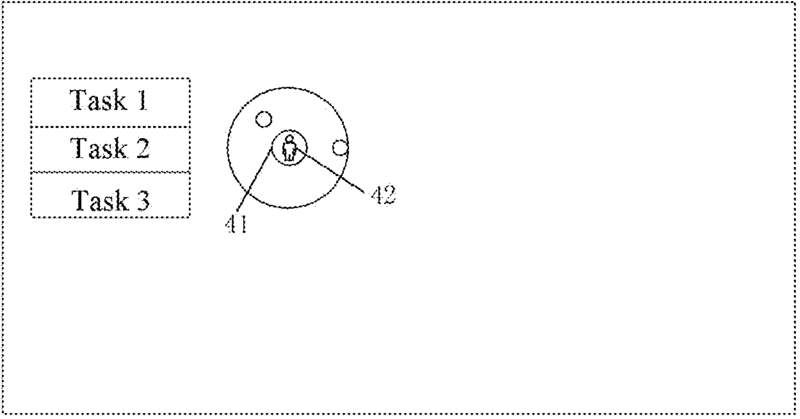
FIG. 6 is a schematic view of a character icon according to an embodiment of the present disclosure.

In the embodiment of the present disclosure, the character icon may include two icons, namely, an outer circle icon and an inner circle icon. For example, the outer circle icon may be represented as a circle of a preset color, where the preset color may be set according to an actual requirement, such as yellow, blue or purple and the like, which is not limited in the embodiment of the present disclosure, and the inner circle icon may be represented as a person icon. As illustrated in FIG. 6, the character icon includes the outer circle icon 41 and the inner circle icon 42. When it is necessary to control the movement of the character icon, the movement of the outer circle icon may be controlled according to the sliding operation and the inner circle icon is kept stationary, so as to indicate a corresponding location of the character icon after it moves through the outer circle icon, and indicate a corresponding location of the character icon before it moves through the inner circle icon.

In some optional embodiments of the present disclosure, before the step of displaying the navigation route on the task guidance map, the method further includes controlling attachment of the outer circle icon to the locations identification.

Figure 7:
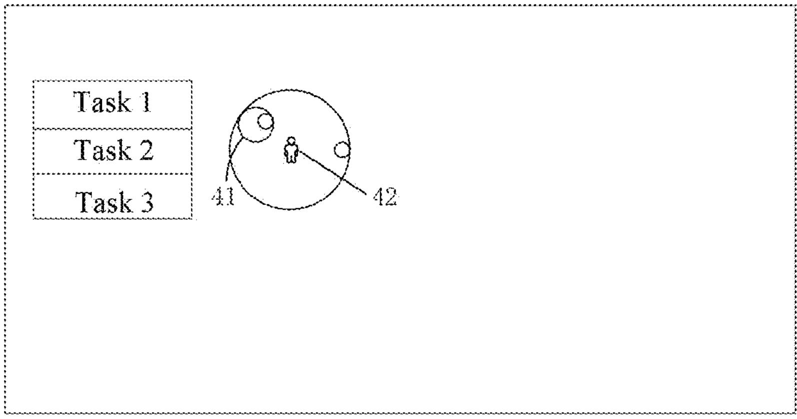
FIG. 7 is a schematic view of an outer circle icon attached onto a location identification according to an embodiment of the present disclosure.

In the embodiment of the present disclosure, in order to facilitate the player to observe a currently selected sub-task, when the outer circle icon moves to a region where a certain location identification in the target task identification is located, the outer circle icon may be controlled to be attached to the location identification. As illustrated in FIG. 7, the character icon includes the outer circle icon 41 and the inner circle icon 42, where the outer circle icon 41 is attached to the location identification, and the inner circle icon remains stationary.

In some optional embodiments of the present disclosure, the step 202 may include the following sub-steps that:

when the one or the plurality of task locations are in a current field of view of the task guidance map, the location identification indicating the one or the plurality of task locations is displayed in the task guidance map; or when the one or the plurality of task locations are not in a current field of view of the task guidance map, the orientation identification indicating the direction to the one or the plurality of task locations is displayed at an edge of the task guidance map.

Specifically, due to a size limitation of the task guidance map, the content displayed in a current field of view in the task guidance map is limited. Thus, the content displayed in the current field of view in the task guidance map may include a part of the task locations in the one or the plurality of task locations corresponding to the target task, while the remaining part of the task locations are not included in the content displayed in the current field of view in the task guidance map.

Thus, when the target task identification is displayed, it may first be determined whether the task location corresponding to each sub-task in the target task is located in the current field of view of the task guidance map. When the task location is in the current field of view of the task guidance map, the location identification of these task locations may be directly displayed in the task guidance map. When the task location is not in the current field of view of the task guidance map, the orientation identification indicating the direction to these task locations is displayed on the edge of the task guidance map. The location displayed by the orientation identification may be an intersection point of the task guidance map and a line segment determined according to the location corresponding to the first location where the virtual character is located in the task guidance map and the task location.

In some optional embodiments of the present disclosure, the orientation identification is in a form of an arrow, and the arrow points to the one or the plurality of task locations.

Figure 8:
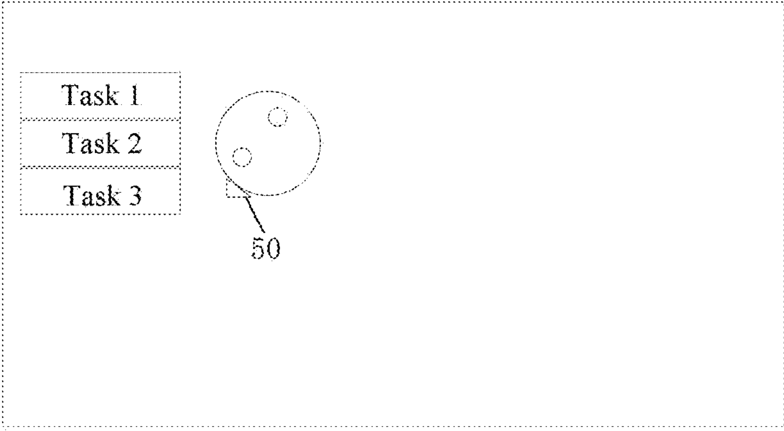
FIG. 8 is a schematic view of an orientation identification displayed on an edge region according to an embodiment of the present disclosure.

In the embodiment of the present disclosure, when the edge of the task guidance map displays the orientation identification indicating the direction to one or a plurality of task locations, the orientation identification may be in a form of an arrow, and the arrow points to the task location. As illustrated in FIG. 8, the orientation identification 50 in the form of arrow is displayed on the edge of the task guidance map.

In some optional embodiments of the present disclosure, the method may also include the following step that:

in response to an end instruction of the selection instruction, the task guidance map is hidden.

The end instruction of the selection instruction may refer to an operation that the operation medium for triggering the selection instruction leaves a display screen of the mobile terminal. When it is detected that the operation medium for triggering the selection instruction leaving the display screen of the mobile terminal, it is equivalent to receiving the end instruction of the selection instruction. The game application may respond to the end instruction and hide the task guidance map to avoid continuing to display the task guidance map, which blocks the player from observing the game scenario on the graphical user interface or observing the game match, and the like.

In the embodiment of the present disclosure, the target task is determined from at least one task in response to the selection instruction for the task panel, one or a plurality of task locations for accomplishing the target task in the game scenario are acquired, and the task guidance map is provided on the graphical user interface; the target task identification is displayed in the task guidance map, where the target task identification includes a location identification located in the task guidance map indicating the one or the plurality of task locations, and/or an orientation identification indicating a direction to one or a plurality of task locations, so as to allow the player to call out the task guidance map through the task panel, and display the task in real time according to the task location of the target task on the task guidance map, which is convenient for the player to quickly locate the task, and also make the mapping relationship between the task and the map scenario clearer for the player.

In addition, the sliding operation acting on the task panel may help the player quickly find a certain sub-task in the target task within the current field of view on the task guidance map, and generate a navigation route on the task location corresponding to the sub-task, so as to help to locate the task, avoid players switching back and forth between the task and the map, and improve the operation efficiency.

It should be noted that for ease of description, the foregoing method embodiments are stated as a series of action combinations. However, a person in the art is to learn that the present disclosure is not limited to the described sequence of the actions, because some steps may be performed in another sequence or may be simultaneously performed. In addition, a person in the art is also to learn that the embodiments described are all optional embodiments, and the involved actions are not necessarily required.

Figure 9:
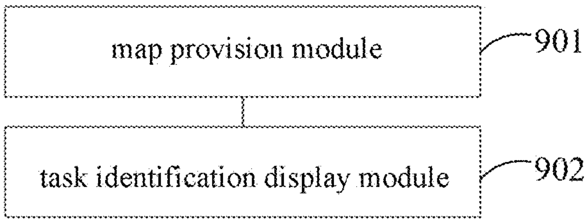
FIG. 9 is a structural block diagram of an apparatus for guiding a task in a game provided by an embodiment of the present disclosure.

Referring to FIG. 9, a structure block diagram of an apparatus for guiding a task in a game provided by an embodiment of the present disclosure is illustrated. A graphical user interface is provided through a mobile terminal, where a content displayed on the graphical user interface includes a task panel and a game scenario, and the task panel includes at least one task, and specifically, the apparatus may include the following modules:

a map provision module 901, configured to determine a target task from the at least one task in response to a selection instruction for the task panel, acquire one or a plurality of task locations for accomplishing the target task in the game scenario, and provide a task guidance map on the graphical user interface; and a task identification display module 902, configured to display a target task identification in the task guidance map, where the target task identification includes a location identification located in the task guidance map indicating the one or the plurality of the task locations, and/or an orientation identification indicating a direction to the one or the plurality of the task locations.

In some optional embodiments of the present disclosure, the graphical user interface further includes a thumbnail map corresponding to the game scenario, and the thumbnail map is configured to display a part or all of the game scenario.

In some optional embodiments of the present disclosure, the graphical user interface includes a thumbnail map corresponding to the game scenario, and the apparatus further includes:

a second task identification display module, configured to display the target task identification in the thumbnail map according to a location corresponding to the one or the plurality of task locations in the thumbnail map.

In some optional embodiments of the present disclosure, a map region displayed on the task guidance map is a map region determined according to a first location of a virtual character in the game scenario; and the apparatus further includes:

a character icon display module, configured to display a character icon corresponding to the virtual character on a location corresponding to the first location in the task guidance map;

a character icon movement module, configured to control movement of the character icon in response to a sliding operation acting on the task panel;

a first navigation route display module, configured to display a navigation route on the task guidance map when the character icon moves to a region where the location identification in the target task identification is located, where a starting point of the navigation route is a location corresponding to the first location in the task guidance map, and an ending point of the navigation route is a second location where the location identification is located; and a virtual character control module, configured to control the virtual character to follow the navigation route.

In some optional embodiments of the present disclosure, the apparatus further includes:

a second navigation route display module, configured to display the navigation route on the thumbnail map in response to a close instruction for the task guidance map.

In some optional embodiments of the present disclosure, the character icon includes an outer circle icon and an inner circle icon, and the character icon movement module includes:

an outer circle icon movement module, configured to control movement of the outer circle icon and keep the inner circle icon stationary in response to the sliding operation acting on the task panel.

In some optional embodiments of the present disclosure, before the step of displaying the navigation route on the task guidance map, the apparatus further includes:

an outer circle icon attachment module, configured to control attachment of the outer circle icon to the location identification.

In some optional embodiments of the present disclosure, the task identification display module 902 is configured to include:

a first display sub-module, configured to display the location identification indicating the one or the plurality of task locations in the task guidance map when the one or the plurality of task locations are in a current field of view of the task guidance map; or a second display sub-module, configured to display the orientation identification indicating the direction to the one or the plurality of task locations on an edge of the task guidance map when the one or the plurality of task locations are not in a current field of view of the task guidance map.

In some optional embodiments of the present disclosure, the orientation identification is in a form of an arrow, and the arrow points to the one or the plurality of task locations.

In some optional embodiments of the present disclosure, the apparatus further includes:

a task guidance map hiding module, configured to hide the task guidance map in response to an end instruction of the selection instruction.

In some optional embodiments of the present disclosure, the map provision module 901 includes:

a map providing sub-module, configured to provide the task guidance map on an edge region of the task panel.

In some optional embodiments of the present disclosure, an operation for triggering the selection instruction and the sliding operation are continuous.

For apparatus embodiments, since they are basically similar to the method embodiments, the description thereof is relatively simple, and reference may be made to the part of the description of the method embodiments for relevant contents.

Figure 10:
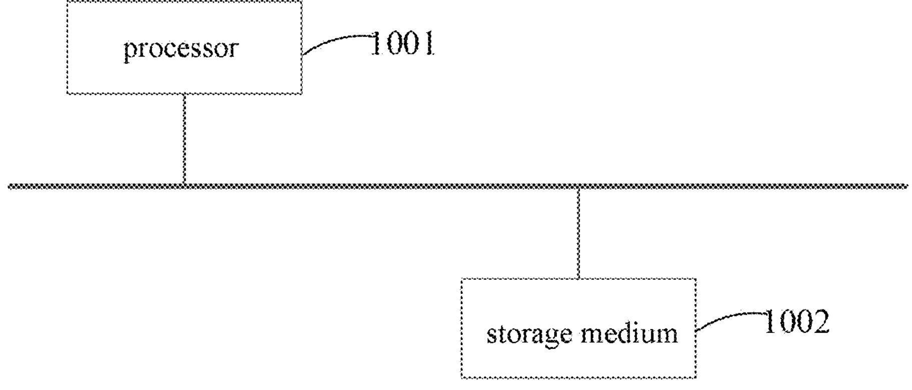
FIG. 10 is a structural block diagram of an electronic device provided by an embodiment of the present disclosure.

The embodiments of the present disclosure also provide an electronic device, as illustrated in FIG. 10, including:

a processor 1001 and a storage medium 1002 storing a machine-readable instruction that is executable by the processor 1001, when the electronic device runs, the processor 1001 executes the machine-readable instruction to execute the following method:

determining, in response to a selection instruction for the task panel, a target task from the at least one task, acquiring one or a plurality of task locations for accomplishing the target task in the game scenario, and providing a task guidance map on the graphical user interface; and displaying a target task identification in the task guidance map, where the target task identification includes a location identification located in the task guidance map indicating the one or the plurality of the task locations, and/or an orientation identification indicating a direction to the one or the plurality of the task locations.

In some optional embodiments, the graphical user interface further includes a thumbnail map corresponding to the game scenario, and the thumbnail map is configured to display a part or all of the game scenario.

In some optional embodiments, the graphical user interface includes a thumbnail map corresponding to the game scenario, after the step of displaying the target task identification in the task guidance map, the method further includes:

displaying, according to a location corresponding to the one or the plurality of task locations in the thumbnail map, the target task identification in the thumbnail map.

In some optional embodiments, a map region displayed on the task guidance map is a map region determined according to a first location of a virtual character in the game scenario; and the method further includes:

displaying a character icon corresponding to the virtual character on a location corresponding to the first location in the task guidance map;

controlling, in response to a sliding operation acting on the task panel, movement of the character icon;

displaying, when the character icon moves to a region where the location identification in the target task identification is located, a navigation route on the task guidance map, where a starting point of the navigation route is a location corresponding to the first location in the task guidance map, and an ending point of the navigation route is a second location where the location identification is located; and controlling the virtual character to follow the navigation route.

In some optional embodiments, the method further includes:

displaying, in response to a close instruction for the task guidance map, the navigation route on the thumbnail map.

In some optional embodiments, the character icon includes an outer circle icon and an inner circle icon, and the controlling the movement of the character icon in response to the sliding operation acting on the task panel includes:

in response to the sliding operation acting on the task panel, controlling movement of the outer circle icon and keeping the inner circle icon stationary.

In some optional embodiments, before the step of displaying the navigation route on the task guidance map, the method further includes controlling attachment of the outer circle icon to the location identification.

In some optional embodiments, the displaying the target task identification in the task guidance map includes:

displaying, in case that the one or the plurality of task locations are in a current field of view of the task guidance map, the location identification indicating the one or the plurality of task locations in the task guidance map; or, displaying, in case that the one or the plurality of task locations are not in a current field of view of the task guidance map, the orientation identification indicating the direction to the one or the plurality of task locations on an edge of the task guidance map.

In some optional embodiments, the orientation identification is in a form of an arrow, and the arrow points to the one or the plurality of task locations.

In some optional embodiments, the method further includes:

hiding, in response to an end instruction of the selection instruction, the task guidance map.

In some optional embodiments, the providing the task guidance map on the graphical user interface includes:

providing the task guidance map on an edge region of the task panel.

In some optional embodiments, an operation for triggering the selection instruction and the sliding operation are continuous.

The implementation and technical effect as described in the embodiments of the present disclosure are similar to the part of the method embodiments, which is not repeated herein.

Figure 11:
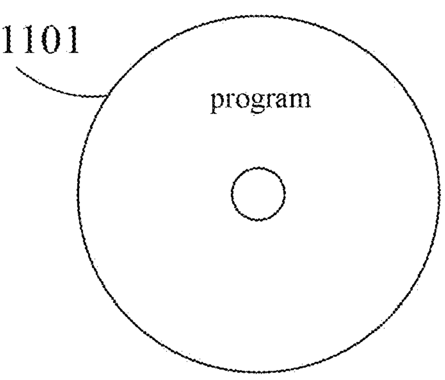
FIG. 11 is a structural block diagram of a storage medium provided by an embodiment of the present disclosure.

The embodiments of the present disclosure further provides a non-transitory computer-readable storage medium, as illustrated in FIG. 11, the non-transitory computer-readable storage medium is configured to store a computer program 1101 execute the following method when executed by a processor:

determining, in response to a selection instruction for the task panel, a target task from the at least one task, acquiring one or a plurality of task locations for accomplishing the target task in the game scenario, and providing a task guidance map on the graphical user interface; and displaying a target task identification in the task guidance map, where the target task identification includes a location identification located in the task guidance map indicating the one or the plurality of the task locations, and/or an orientation identification indicating a direction to the one or the plurality of the task locations.

In some optional embodiments, the graphical user interface further includes a thumbnail map corresponding to the game scenario, and the thumbnail map is configured to display a part or all of the game scenario.

In some optional embodiments, the graphical user interface includes a thumbnail map corresponding to the game scenario, after the step of displaying the target task identification in the task guidance map, the method further includes:

displaying, according to a location corresponding to the one or the plurality of task locations in the thumbnail map, the target task identification in the thumbnail map.

In some optional embodiments, a map region displayed on the task guidance map is a map region determined according to a first location of a virtual character in the game scenario; and the method further includes:

displaying a character icon corresponding to the virtual character on a location corresponding to the first location in the task guidance map;

controlling, in response to a sliding operation acting on the task panel, movement of the character icon;

displaying, when the character icon moves to a region where the location identification in the target task identification is located, a navigation route on the task guidance map, where a starting point of the navigation route is a location corresponding to the first location in the task guidance map, and an ending point of the navigation route is a second location where the location identification is located; and controlling the virtual character to follow the navigation route.

In some optional embodiments, the method further includes:

displaying, in response to a close instruction for the task guidance map, the navigation route on the thumbnail map.

In some optional embodiments, the character icon includes an outer circle icon and an inner circle icon, and the controlling the movement of the character icon in response to the sliding operation acting on the task panel includes:

in response to the sliding operation acting on the task panel, controlling movement of the outer circle icon and keeping the inner circle icon stationary.

In some optional embodiments, before the step of displaying the navigation route on the task guidance map, the method further includes controlling attachment of the outer circle icon to the location identification.

In some optional embodiments, the displaying the target task identification in the task guidance map includes:

displaying, in case that the one or the plurality of task locations are in a current field of view of the task guidance map, the location identification indicating the one or the plurality of task locations in the task guidance map; or, displaying, in case that the one or the plurality of task locations are not in a current field of view of the task guidance map, the orientation identification indicating the direction to the one or the plurality of task locations on an edge of the task guidance map.

In some optional embodiments, the orientation identification is in a form of an arrow, and the arrow points to the one or the plurality of task locations.

In some optional embodiments, the method further includes:

hiding, in response to an end instruction of the selection instruction, the task guidance map.

In some optional embodiments, the providing the task guidance map on the graphical user interface includes:

providing the task guidance map on an edge region of the task panel.

In some optional embodiments, an operation for triggering the selection instruction and the sliding operation are continuous.

The implementation and technical effect as described in the embodiments of the present disclosure are similar to the part of the method embodiments, which is not repeated herein.

The various embodiments in the present specification are described in a progressive manner, and description of each embodiment focuses on differences from other embodiments, and the same or the similar parts between the various embodiments can be referred to each other.

Those skilled in the art will appreciate that embodiments of the disclosed embodiments can be provided as a method, apparatus, or computer program product. Thus, embodiments of the present disclosure can take the form of an entirely hardware embodiment, an entirely software embodiment, or a combination of software and hardware. Moreover, embodiments of the present disclosure can take the form of a computer program product embodied on one or more computer usable storage medium (including and not limited to disk storage, CD-ROM, optical storage, and the like) including computer usable program code.

Embodiments of the present disclosure are described with reference to flowchart and/or block diagrams of methods, terminal devices (systems), and computer program products according to embodiments of the present disclosure. It should be understood that each process and/or block of the flowchart or the block diagrams, and a combination of process and/or block of the flowchart or the block diagrams by computer program instructions can be implemented. The computer instructions can be provided to a general purpose computer, special purpose computer, embedded processor or other programmable data processing terminal device to produce a machine such that instructions executed by a processor of a computer or other programmable data processing terminal device are configured to produce an apparatus for implementing the functions specified in one or more of the processes in the flowchart or in one or more blocks of the diagram blocks.

These computer program instructions can further be stored in a computer readable memory that can direct a computer or other programmable data processing terminal device to operate in a particular manner, such that the instructions stored in the computer readable memory produce a product including the instruction device. The instruction device implements the functions specified in one or more of the processes in the flowchart or in one or more blocks of the diagram blocks.

These computer program instructions can further be loaded onto a computer or other programmable data processing terminal device such that a series of operational steps are performed on the computer or other programmable terminal device to produce computer-implemented processing, such that the instructions executed on the computer or other programmable terminal device provide steps for implementing the functions specified in one or more of the processes in the flowchart or in one or more blocks of the diagram blocks.

While the embodiments of the present disclosure have been described, it will be apparent that the skilled in the art can make further changes and modifications to the embodiments upon learning the essential inventive concept of the present disclosure. Therefore, the appended claims are intended to be interpreted as comprising the embodiments and the modifications and variations falling into the scope of the embodiments.

Finally, it should also be noted that in the present disclosure, relational terms such as first and second are used merely to distinguish one entity or operation from another entity or operation, and do not necessarily require or imply that there is relation or sequence between these entities or operations. Furthermore, the terms "including" or "containing" or any other variations that are intended to encompass a non-exclusive inclusion, such that a process, method, article, or terminal device that includes a plurality of elements includes not only those elements but also other elements that are named specifically, or include elements inherent to such a process, method, article, or terminal device. An element defined by the phrase "comprising a . . . " does not exclude the presence of additional identical elements in the process, method, article, or terminal device that includes the element, without further limitation.

The method and the apparatus for guiding the task in the game provided by the present disclosure are described in detail above, and the principles and the embodiments of the present disclosure are depicted through specific examples. However, the description of the embodiments is merely provided for understanding the gist of the methods and the devices of the present disclosure. Based on the gist of the present disclosure, modifications in the specific embodiments and in the applications of the present disclosure can easily occur to one skilled in the art. In general, the contents contained in the description cannot be construed as a limit to the present disclosure.

What is claimed is:

1. A method for guiding a task in a game, wherein a graphical user interface is provided through a mobile terminal, a content displayed on the graphical user interface comprises a task panel, and a game scenario, and the task panel comprises at least one task, wherein the method comprises:

determining, in response to a selection instruction for the task panel, a target task from the at least one task, acquiring one or a plurality of task locations for accomplishing the target task in the game scenario, and providing a task guidance map on the graphical user interface; and displaying a target task identification in the task guidance map, wherein the target task identification comprises at least one of the following:

a location identification located in the task guidance map indicating the one or the plurality of the task locations, or an orientation identification indicating a direction to the one or the plurality of the task locations;

wherein a map region displayed on the task guidance map is a map region determined according to a first location of a virtual character in the game scenario; and the method further comprises:

displaying a character icon corresponding to the virtual character on a location corresponding to the first location in the task guidance map;

controlling, in response to a sliding operation acting on the task panel, movement of the character icon;

displaying, in response to that the character icon moves to a region where the location identification in the target task identification is located, a navigation route on the task guidance map, wherein a starting point of the navigation route is a location corresponding to the first location in the task guidance map, and an ending point of the navigation route is a second location where the location identification is located; and controlling the virtual character to follow the navigation route.

2. The method according to claim 1, wherein the graphical user interface further comprises a thumbnail map corresponding to the game scenario, and the thumbnail map is configured to display a part or all of the game scenario.

3. The method according to claim 2, wherein the thumbnail is displayed on a preset location in the graphical user interface.

4. The method according to claim 2, wherein the graphical user interface comprises a setting control for adjusting a location where the thumbnail map is displayed.

5. The method according to claim 1, wherein the graphical user interface comprises a thumbnail map corresponding to the game scenario, the method further comprises:

displaying, according to a location corresponding to the one or the plurality of task locations in the thumbnail map, the target task identification in the thumbnail map.

6. The method according to claim 1, wherein the graphical user interface further comprises a thumbnail map corresponding to the game scenario, and the method further comprises:

displaying, in response to a close instruction for the task guidance map, the navigation route on the thumbnail map.

7. The method according to claim 1, wherein the character icon comprises an outer circle icon and an inner circle icon, and the controlling the movement of the character icon in response to the sliding operation acting on the task panel comprises:

in response to the sliding operation acting on the task panel, controlling movement of the outer circle icon and keeping the inner circle icon stationary.

8. The method according to claim 7, wherein the method further comprises controlling attachment of the outer circle icon to the location identification.

9. The method according to claim 1, wherein the displaying the target task identification in the task guidance map comprises:

displaying, in case that the one or the plurality of task locations are in a current field of view of the task guidance map, the location identification indicating the one or the plurality of task locations in the task guidance map; or, displaying, in case that the one or the plurality of task locations are not in a current field of view of the task guidance map, the orientation identification indicating the direction to the one or the plurality of task locations on an edge of the task guidance map.

10. The method according to claim 1, wherein the orientation identification is in a form of an arrow, and the arrow points to the one or the plurality of task locations.

11. The method according to claim 1, further comprising:

hiding, in response to an end instruction of the selection instruction, the task guidance map.

12. The method according to claim 1, wherein the providing the task guidance map on the graphical user interface comprises:

providing the task guidance map on an edge region of the task panel.

13. The method according to claim 1, wherein an operation for triggering the selection instruction and the sliding operation are continuous.

14. The method according to claim 13, wherein the operation for triggering the selection instruction is one of the following operations: a long-press operation or a heavy-press operation.

15. The method according to claim 1, wherein the selection instruction comprises a touch location, and the target task is determined from the at least one task according to the touch location by extracting the touch location in the selection instruction.

16. The method according to claim 1, wherein the providing the task guidance map on the graphical user interface comprises:

providing the task guidance map on an edge region of the task panel, wherein the edge region is a region on an edge of the task panel.

17. The method according to claim 1, wherein the sliding operation comprises a plurality of continuous touch locations, and the character icon is controlled to move according to the plurality of touch locations by extracting the plurality of touch locations in the sliding operation.

18. An electronic device, comprising:

a processor and a storage medium storing a machine-readable instruction that is executable by the processor, when the electronic device runs, the processor is configured to:

determine, in response to a selection instruction for a task panel, a target task from at least one task, acquire one or a plurality of task locations for accomplishing the target task in a game scenario, and provide a task guidance map on a graphical user interface; wherein a content displayed on the graphical user interface comprises the task panel, and the game scenario, and the task panel comprises the at least one task; and display a target task identification in the task guidance map, wherein the target task identification comprises at least one of the following:

a location identification located in the task guidance map indicating the one or the plurality of the task locations, or an orientation identification indicating a direction to the one or the plurality of the task locations;

wherein a map region displayed on the task guidance map is a map region determined according to a first location of a virtual character in the game scenario; wherein the processor is further configured to:

display a character icon corresponding to the virtual character on a location corresponding to the first location in the task guidance map;

control, in response to a sliding operation acting on the task panel, movement of the character icon;

display, in response to that the character icon moves to a region where the location identification in the target task identification is located, a navigation route on the task guidance map, wherein a starting point of the navigation route is a location corresponding to the first location in the task guidance map, and an ending point of the navigation route is a second location where the location identification is located; and control the virtual character to follow the navigation route.

19. A non-transitory computer-readable storage medium configured to store a computer program, when executed by a processor, the computer program cause the processor to implement a method for guiding a task in a game, wherein a graphical user interface is provided through a mobile terminal, a content displayed on the graphical user interface comprises a task panel, and a game scenario, and the task panel comprises at least one task, and the method comprises:

determining, in response to a selection instruction for the task panel, a target task from the at least one task, acquiring one or a plurality of task locations for accomplishing the target task in the game scenario, and providing a task guidance map on the graphical user interface; and displaying a target task identification in the task guidance map, wherein the target task identification comprises at least one of the following:

a location identification located in the task guidance map, or an orientation identification indicating a direction to the one or the plurality of the task locations;

wherein a map region displayed on the task guidance map is a map region determined according to a first location of a virtual character in the game scenario; and the method further comprises:

displaying a character icon corresponding to the virtual character on a location corresponding to the first location in the task guidance map;

controlling, in response to a sliding operation acting on the task panel, movement of the character icon;

displaying, in response to that the character icon moves to a region where the location identification in the target task identification is located, a navigation route on the task guidance map, wherein a starting point of the navigation route is a location corresponding to the first location in the task guidance map, and an ending point of the navigation route is a second location where the location identification is located; and controlling the virtual character to follow the navigation route.

* * * * *